United States Patent [19]

Sipe et al.

[11] Patent Number: 5,790,296
[45] Date of Patent: Aug. 4, 1998

[54] METHOD AND APPARATUS FOR CONTROLLING PROPAGATION OF ELECTRICAL CHARGES USING MULTIPLE COHERENT LIGHT BEAMS

[76] Inventors: John Edward Sipe, 45-1217 Carlton Street, Toronto, Ontario; Henry Martin Van Driel, 386 Clarksville Court, Mississauga, Ontario, both of Canada, M5B 2H9

[21] Appl. No.: 700,167

[22] Filed: Aug. 20, 1996

[51] Int. Cl.⁶ ................................................ G02F 1/03
[52] U.S. Cl. ........................ 359/248; 257/222; 257/431
[58] Field of Search ............................... 257/431, 436, 257/438, 441, 222, 228; 359/248

[56] References Cited

U.S. PATENT DOCUMENTS

| | | | |
|---|---|---|---|
| 4,878,104 | 10/1989 | Reed et al. | 357/30 |
| 5,101,109 | 3/1992 | Jiang et al. | 250/338.4 |
| 5,214,276 | 5/1993 | Himoto et al. | 250/214.1 |
| 5,459,604 | 10/1995 | Corkum et al. | 359/248 |

OTHER PUBLICATIONS

"Coherent Control of Photocurrent Generation in Bulk Semiconductors", *Physical Review Letters*, vol. 76, No. 10, 4 Mar. 1996, R. Atanasov, A. Haché, J.L.P. Hughes, H.M. van Driel and J.E. Sipe.

*Primary Examiner*—Georgia Y. Epps
*Assistant Examiner*—Thomas Robbins
*Attorney, Agent, or Firm*—Riches, McKenzie & Herbert

[57] ABSTRACT

A method and apparatus for generating and controlling the propagation of electrons in a semiconductor material using a plurality of beams of coherent light is disclosed. The direction and magnitude of propagation of the electrons in the semiconductor are controlled by varying the polarization of the coherent beams with respect to the semiconductor material, and in particular the crystallographic axis of the semiconductor material. The electrons are generated and controlled by use of three coherent beams which are related such that the frequency of one of the beams is substantially equal to the sum of the frequencies of the other beams, and the first beam produces substantially the same number of electrons in the semiconductor material that the other beams produce together. A selected region of the semiconductor material is simultaneously irradiated with all of the beams of light. The semiconductor material is at approximately room temperature. Holes are also generated and propagate in a direction opposite to the direction of propagation of the electrons.

24 Claims, 4 Drawing Sheets

METHOD AND APPARATUS FOR CONTROLLING PROPAGATION OF ELECTRICAL CHARGES USING MULTIPLE COHERENT LIGHT BEAMS

FIELD OF THE INVENTION

This invention relates generally to a method and apparatus for generating and controlling the propagation of electrical charges, such as photoelectrons and holes, in a semiconductor material. More particularly, the invention relates to generating and controlling the magnitude and direction of the current produced in a semiconductor material from multiple laser beams by varying the phase difference between the beams and/or the polarization of one or more of the beams with respect to the semiconductor. In one embodiment, the invention relates to using two or more laser beams to control the propagation of photoelectrons in a bulk semiconductor by varying the phase difference between the beams, and/or, the polarization of one or more of the beams.

BACKGROUND OF THE INVENTION

In the past, it has been known to cause a current to flow in a semiconductor material by applying a voltage differential across the semiconductor. Such a voltage differential can be applied by using wires connected across the semiconductor.

The present invention relates to generation of charge carriers in semiconductors using optical beams irradiating a region of the semiconductor. The charge carriers generated in this manner form a current which has a direction and a magnitude. The direction and magnitude of the current is dependent upon the interference effects in the generation process as determined by characteristics of the optical beams, such as the relative phase difference between the beams and the polarization of the beams.

In U.S. Pat. No. 5,459,604 in the name of Corkum and Liu, a method and apparatus for propagating photoelectrons in a semiconductor material is disclosed. However, the system and apparatus disclosed in this reference relates to use of two beams only. This reference discloses that the two beams must be harmonically related such that the frequency of one beam is approximately twice the frequency of the other beam. In addition, this reference discloses only one manner of controlling the propagating photoelectrons, namely by varying the phase relationship between the two beams of light. Moreover, this reference only discloses an apparatus comprising a specific type of semiconductor material, namely a quantum well, which can only be used at low temperatures such as about 80 K and does not produce positively charged holes. In addition, the wavelengths disclosed in this reference are in the range of 5 to 10 microns, which is far in the infrared range.

Accordingly, the prior art suffers from the disadvantages that only beams being harmonically related can be used, and that only varying the phase relationship between the beams can be used to vary the direction of propagation of photoelectrons. Moreover, the prior art only discloses the use of a specific type of semiconductor material, namely a quantum well, which must be used at temperatures substantially below room temperature.

SUMMARY OF THE INVENTION

Accordingly, it is an object of this invention to at least partially overcome the disadvantages of the prior art. Also, it is an object of this invention to provide an alternative type of apparatus and, method to generate and control the propagation of photoelectrons in a semiconductor material. This type of method and apparatus would be more versatile than the prior art in that coherent beams which are not harmonically related could be used, bulk semiconductors in addition to quantum wells could be used, and polarization in addition to phase relationship between the beams can be used to control the propagating photoelectrons. In addition, this method and apparatus can be used at room temperature using coherent light beams having wavelengths which are generally accepted in the industry.

Accordingly, in one of its aspects, this invention resides in providing a method of generating and propagating electrons in a semiconductor material, said propagating electrons creating a current having a direction and a magnitude, the method comprising the steps of: simultaneously irradiating a selected region of the semiconductor material with a first coherent light beam having a first frequency and at least two other coherent light beams, each beam having a frequency, wherein said first light beam and said at least two other light beams are related such that the first frequency substantially equals a sum of the frequencies of the at least two other coherent light beams, and wherein the at least two other beams together produce substantially the same number of electrons in the semiconductor material as the first beam.

In one embodiment, the invention relates to the use of three coherent light beams, or laser beams, related such that the frequency of one beam substantially equals the sum of the frequencies of the other two beams, and, each of the beams have an intensity such that they produce substantially the same number of photoelectrons in the semiconductor material.

In a further embodiment, the present invention relates to varying a polarization of at least one of the beams to change the direction and/or magnitude of propagation of the photoelectrons.

In a further embodiment, the present invention relates to use of a semiconductor material comprising gallium arsenide at a temperature between −40° C. and 100° C.

In a further aspect, the present invention provides a method of generating and propagating electrons in a semiconductor material, the propagating electrons creating a current having a direction and a magnitude, the method comprising the steps of: simultaneously irradiating a selected region of the semiconductor material with a first coherent light beam having a first frequency and a second coherent light beam having a second frequency, wherein said first light beam and the second light beam are related such that the first frequency is substantially twice the second frequency and the first beam produces substantially the same number of electrons in the semiconductor material as the second beam; and varying a polarization of the first beam or the second beam relative to the semi-conductor to change the direction and magnitude of the current.

In another aspect, the present invention provides an apparatus for controlling propagation of electrons in a semiconductor material comprising: coherent light source means for providing a first coherent light beam having a first frequency and at least two other coherent light beams, each of the at least two other beams having a frequency, to simultaneously irradiate a selected region of the semiconductor material, the coherent light beams being related such that the first frequency substantially equals a sum of the frequencies of the at least two other coherent light beams, and wherein each of the beams have an amplitude such that the at least two other beams together produce substantially the same number of electrons in the semiconductor material as the first beam; wherein irradiating the selected region of the semiconductor causes electrons to propagate in the semiconductor, said propagating electrons creating a current having a direction and a magnitude.

Further aspects and advantages of the invention will become apparent upon reading the following detailed description and the drawings which illustrate the invention and preferred embodiments of the invention.

It is understood that while the present invention will be described generally in terms of a method and apparatus for varying or controlling propagation of photoelectrons in a semiconductor, the present invention can relate to any type of device or method where the propagation of photoelectrons, and electrical charges in general, need be controlled, such as for the detection of current, or for an application in which coherent control is used to switch other devices or detect changes in the phase or polarization of coherent light beams.

BRIEF DESCRIPTION OF THE DRAWINGS

In the drawings, which illustrate embodiments of the invention.

DETAILED DESCRIPTION OF PREFERRED EMBODIMENTS OF THE INVENTION

Figure 1A:
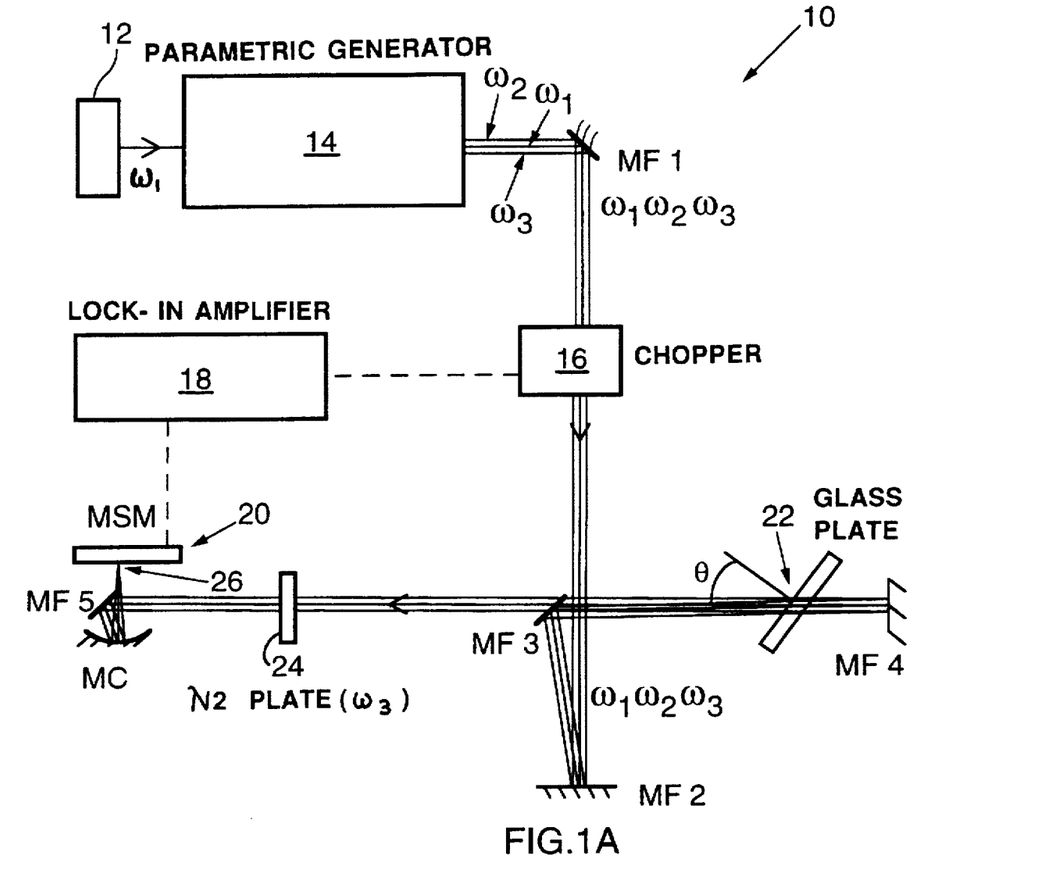
FIG. 1A is a block diagram of an apparatus according to one embodiment of the present invention.

Reference is made to FIG. 1A which shows an apparatus, shown generally as 10, according to one embodiment of the present invention. The apparatus 10 comprises a first optical source 12 which produces a coherent light beam, such as a laser beam. In a preferred embodiment, the first optical source 12 is an actively mode-locked picosecond Ti:sapphire laser operating at 800 nm with a corresponding frequency $\omega_1$ being about $3.75 \times 10^{14}$ Hz. For convenience this beam shall be referred to as the first beam $\omega_1$ and shall be identified in FIG. 1A by the reference symbol $\omega_1$.

The first beam $\omega_1$ synchronously pumps a KTP (potassium titanyl phosphate)-based parametric generator 14. The generator 14 produces a 1 ps signal pulses turnable near 1.5 μm and 1.7 μm wavelength in 1 ps signal pulses. The 1.5 μm wavelength laser beam has a frequency $\omega_2$ of $2 \times 10^{14}$ Hz, and shall be referred to as the second beam $\omega_2$ and identified in FIG. 1A by the reference symbol $\omega_2$, and likewise, the 1.7 μm wavelength beam has a frequency of about $1.76 \times 10^{14}$ Hz and shall be referred to as the third beam $\omega_3$ and identified by the reference symbol $\omega_3$.

In the embodiment shown in FIG. 1A, the parametric generator 14 will generate the laser beams $\omega_1$, $\omega_2$, $\omega_3$ in such a manner that all three beams $\omega_1$, $\omega_2$, $\omega_3$ are linearly polarized. However, the second beam $\omega_2$ will be linearly polarized in the same direction as the first beam $\omega_1$ and the third beam $\omega_3$ will be linearly polarized in a direction orthogonal to the direction of the polarization of the first beam $\omega_1$ and second beam $\omega_2$. The generator 14 can also be used to control the relative intensities of the three beams $\omega_1$, $\omega_2$, $\omega_3$.

The three beams $\omega_1$, $\omega_2$, $\omega_3$ are reflected by a first flat mirror MF1 into a chopper 16. The chopper 16 is connected to a lock-in amplifier 18. In combination, the chopper 16 and lock-in amplifier 18 average the signals produced by the three laser beams $\omega_1$, $\omega_2$, $\omega_3$. In addition, the lock-in amplifier 18 measures and records the current or current density J generated in the semiconductor 20.

After the chopper 16, the three beams $\omega_1$, $\omega_2$, $\omega_3$ are reflected by the second flat mirror MF2 to a third flat mirror MF3 which is partially transparent. The third flat mirror MF3 reflects the three beams $\omega_1$, $\omega_2$, $\omega_3$ to a glass plate 22. The glass plate 22 alters the phase relationship between the three beams $\omega_1$, $\omega_2$, $\omega_3$. The angle of incidence $\theta$ of the three beams $\omega_1$, $\omega_2$, $\omega_3$ can be changed by rotating the glass plate 22. The difference in the phase relationship will depend on the difference in dispersion between the three beams $\omega_1$, $\omega_2$, $\omega_3$. The phase relationship between the three laser beams $\omega_1$, $\omega_2$, $\omega_3$ will change with the angle $\theta$ in a controlled manner. The beams $\omega_1$, $\omega_2$, $\omega_3$ are reflected back by the fourth flat mirror MF4 to pass through the glass plate 22 a second time. In this way, misalignment is avoided and the glass plate 22 operates on the three beams $\omega_1$, $\omega_2$, $\omega_3$ twice.

In a preferred embodiment, the glass plate 22 is a 1 mm thick BK7 glass window with a ⅕ wavelength surface flatness. The glass plate 22 is mounted on a double pass configuration so that the spatial walk-off effects vanish.

The three beams $\omega_1$, $\omega_2$, $\omega_3$ then pass through the third flat mirror MF3 and through a half wave plate 24. The half wave plate 24 operates on at least one of the laser beams $\omega_1$, $\omega_2$, $\omega_3$ to change the polarization of the beams $\omega_1$, $\omega_2$, $\omega_3$. The half wave plate 24 can operate on any one of the three beams $\omega_1$, $\omega_2$, $\omega_3$ as well as more than one of the beams $\omega_1$, $\omega_2$, $\omega_3$. In this way, the polarization of the three beams $\omega_1$, $\omega_2$, $\omega_3$ can be oriented with respect to each other and with respect to the semiconductor 20.

In the embodiment shown in FIG. 1A, the half wave plate 24 is a 0.75 mm thick quartz half wave plate and operates on the third beam $\omega_3$ to convert the initially orthogonally polarized third beam $\omega_3$ to have the same linear polarization state as the other two beams, namely the first beam $\omega_1$ and the second beam $\omega_2$. In other words, the half wave plate 24 changes the polarization of the third beam $\omega_3$ from orthogonal to the polarization of the first and second beams $\omega_1$, $\omega_2$, which is how the three beams $\omega_1$, $\omega_2$, $\omega_3$ are generated by the parametric generator 14, to be parallel to the polarization of the first and second beams $\omega_1$, $\omega_2$, so that all three beams $\omega_1$, $\omega_2$, $\omega_3$ are polarized in the same way.

The three beams $\omega_1$, $\omega_2$, $\omega_3$ are then reflected by a fifth flat mirror MF5 to a curved mirror MC. The curved mirror MC has a focal length of 2.5 cm which focuses the three beams $\omega_1$, $\omega_2$, $\omega_3$ onto a selected region 26 on the semiconductor 20. In a preferred embodiment, the curved mirror MC is a gold spherical mirror which focuses the three beams $\omega_1$, $\omega_2$, $\omega_3$ onto a selected region 26 which is a 100 μm diameter spot. The selected region 26 is shown in detail in FIG. 1B. The selected region 26 of the semiconductor 20 is simultaneously irradiated by all three beams $\omega_1$, $\omega_2$, $\omega_3$.

In the embodiment shown in FIG. 1A, the three beams $\omega_1$, $\omega_2$, $\omega_3$ have an amplitude such that the first beam $\omega_1$, which has the highest frequency, generates substantially the same number of electrons in the semiconductor material as the other two beams, namely the second beam $\omega_2$ and the third beam $\omega_3$, produce together. This is accomplished in the preferred embodiment shown in FIG. 1A by the parametric generator 14 being adjusted so that the amplitude of the three beams $\omega_1$, $\omega_2$, $\omega_3$ is such that the second beam $\omega_2$ and the third beam $\omega_3$ together produce substantially the same number of electrons in the semiconductor material 20 as the first beam $\omega_1$. Alternately, the same effect can be obtained by placing filters, or other attenuating devices, which would attenuate the beams $\omega_1$, $\omega_2$, $\omega_3$ such that this condition can be satisfied.

When the selected region 26 of the semiconductor 20 is simultaneously irradiated with the three beams $\omega_1$, $\omega_2$, $\omega_3$, electrical charges in the semiconductor 20 will be generated and will propagate in a direction. The propagating electrical charges will form an electrical current having a direction and magnitude. The electrical charges in the semiconductor 20 comprise electrons and, depending on the nature of the semiconductor 20, the electrical charges can also comprise holes. The electrons have a negative electrical charge while the holes have a positive electrical charge. The holes generally propagate in a direction which is opposite to the propagation of the electrons.

Figure 1B:
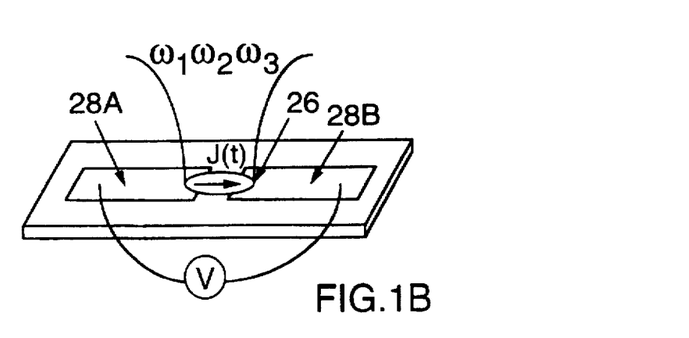
FIG. 1B is a detail drawing showing the semiconductor being irradiated by the laser beams.

In FIG. 1B, the direction of propagation of the electrons is shown by the current density vector J(t). If holes are also generated, the holes would have the same magnitude but the opposite direction of propagation to the electrons. In the present embodiment, the current created by the electrons propagating in the semiconductor 20 can be sensed by the lock-in amplifier 18.

In a preferred embodiment, the semiconductor 20 is an electrically unbiased, planar, metal-semiconductor-metal (MSM) device. The semiconductor is a 1 μm thick epilayer of undoped GaAs grown at low temperature, about 200° C., on a GaAs substrate with (100) orientation and is annealed for 10 minutes at 650 K. The semiconductor 20, made in this manner, shall be referred to as LT-GaAs, and has a 2% excess arsenic concentration which produces a high resistivity of more than 1,000,000Ω*cm and an electron, hole trapping time of about 1 ps.

The use of LT-GaAs has several advantages. For example, since electrons and holes are trapped so quickly, deleterious effects associated with charge accumulation during high repetition rate pulse illumination are prevented. A short trapping time also prevents the metal-substrate-metal configuration from acting as a capacitor and discharging through the semiconductor since it returns to an insulating state shortly after optical excitation.

Several pairs of 200 μm by 250 μm gold electrodes, shown as 28A and 28B in FIG. 1B, having an approximate thickness of 170 nm and with gaps of 5 μm to 50 μm are deposited on the LT-GaAs semiconductor 20 using photolithography. The electrodes 28A, 28B are placed so as to have the gap direction parallel to the (100) crystallographic axis of the semiconductor 20.

In this configuration, the dark resistance of the 5 μm gap MSM is measured to be 13.2MΩ with a capacitance of 6 pF giving a RC rise time constant of approximately 1 ms in the dark. For peak semiconductor radiance of 20MW/cm$^2$ and 3kW/cm$^2$ at the frequencies $\omega_1$, $\omega_2$, $\omega_3$ the optical properties of normal GaAs and LT-GaAs do not differ significantly for the wavelength considered. The magnitude and direction of the electrons and holes propagating in the semiconductor 20 can be measured by measuring the voltage or current across the two electrodes 28A, 28B.

Figure 2:
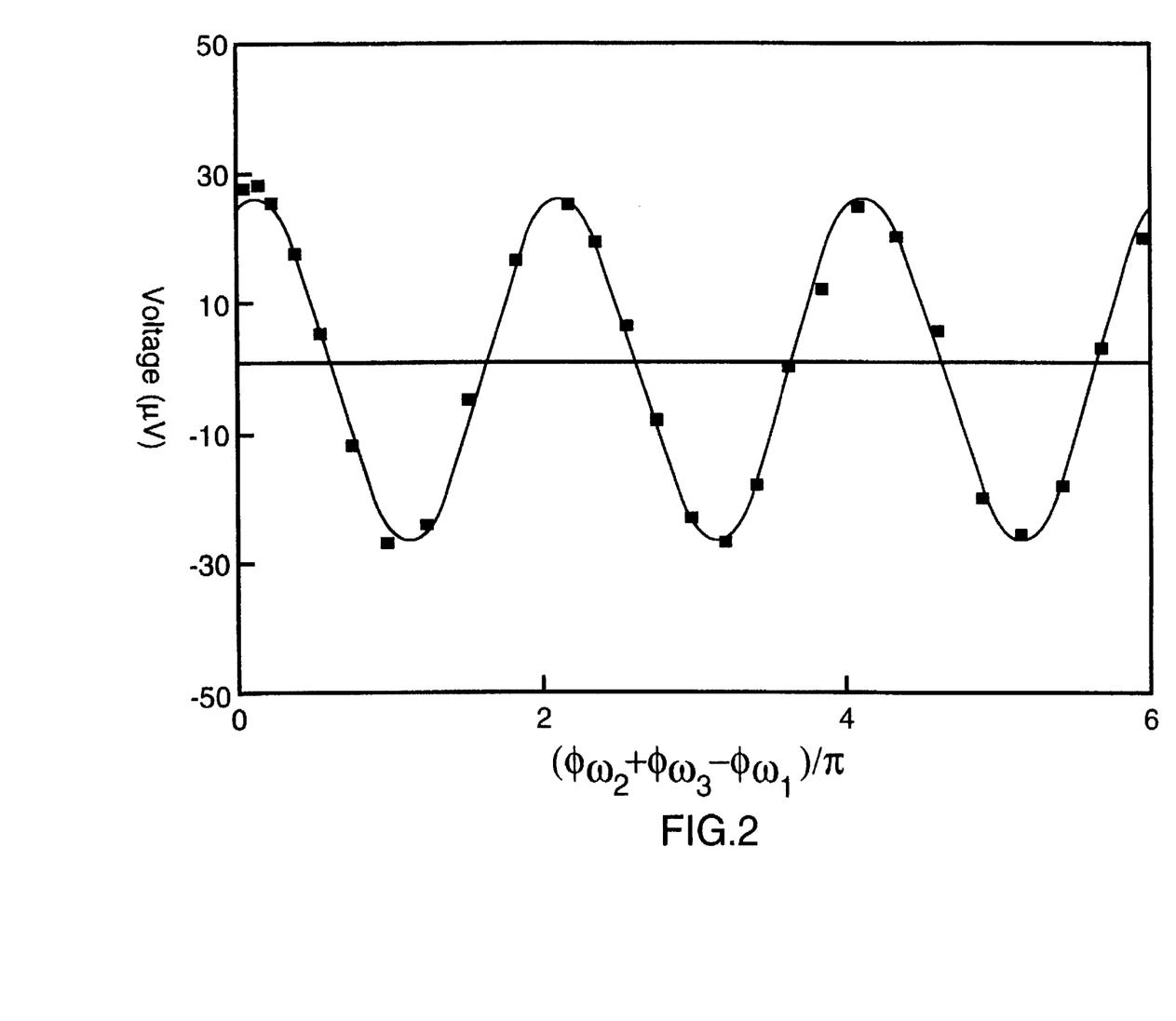
FIG. 2 is a graph illustrating control of the propagation of photoelectrons by varying the phase differential between the three light beams.

By irradiating the selected region 26 simultaneously with the three beams $\omega_1$, $\omega_2$, $\omega_3$, the electrons will be generated and will propagate in the semiconductor 20 in a direction. The propagating electrons create a current having a direction and a magnitude. The direction and magnitude of the current will be dependent on the phase relationship amongst the three beams $\omega_1$, $\omega_2$, $\omega_3$. By varying the phase relationship between the three beams $\omega_1$, $\omega_2$, $\omega_3$, the direction and magnitude of the current in the semiconductor 20 can be varied and thereby controlled. This is illustrated in FIG. 2 which shows the voltage measured across the semiconductor 20 by the lock-in amplifier 18 as the relative phase between the second and third beams $\phi_{\omega 2}+\phi_{\omega 3}$ with respect to the phase of the first beam $\phi_{\omega 1}$. The phase relationship $\phi_{1 \omega 2}+\phi_{\omega 3}-\phi_{\omega 1}$ can be varied by increasing or decreasing the angle θ of the glass plate 22. It is understood that the direction and the magnitude of the current can be controlled by varying the phase relationship between any of the three beams $\omega_1$, $\omega_2$ and $\omega_3$.

In addition to varying the relative phase between the three beams $\omega_1$, $\omega_2$, $\omega_3$, it is also possible to vary, and thereby control, the direction of the propagating electrical charges, namely the electrons and/or holes, by varying the polarization of one or more of the three beams $\omega_1$, $\omega_2$, $\omega_3$. It is thereby possible to vary, and thereby control, the direction and/or magnitude of the current created by the propagating electrical charges. In order to obtain the greatest magnitude of the current in a particular direction, all three beams, $\omega_1$, $\omega_2$, $\omega_3$ are linearly polarized and the polarization is across the gap along the (100) crystallographic axis of the lattice of the semiconductor 20. The semiconductor 20 is oriented such that the linear polarization of the three beams $\omega_1$, $\omega_2$, $\omega_3$ is across the gap along the (100) crystallographic axis.

By varying the polarization of at least one of the beams $\omega_1$, $\omega_2$, $\omega_3$ with respect to the (100) crystallographic axis, the direction and magnitude of the current in the semiconductor 20 can be varied and thereby controlled. For example, as shown in FIG. 1A, the first and second beams $\omega_1$, $\omega_2$ can be oriented such that their polarization is across the gap along the (100) crystallographic axis, but the polarization of the third beam $\omega_3$ can be varied by rotating the half wave plate 24. By doing so, the direction and/or magnitude of the current in the semiconductor 20 can be changed and thereby controlled. In a similar manner, the polarization of any one, or all, of the linearly polarized beams $\omega_1$, $\omega_2$, $\omega_3$ can be varied. Likewise, any one, or all, of the beams $\omega_1$, $\omega_2$, $\omega_3$ can have a circular or an elliptical polarization. By varying the polarization of any one, or any combination of, the three beams $\omega_1$, $\omega_2$, $\omega_3$, the direction and magnitude of the current created by the propagating charges, namely the electrons and/or holes, in the semiconductor 20 will change in a predetermined manner, and therefore can be controlled.

Without limiting the invention, it has been found that the direction and magnitude of propagation of electrical charges, namely electrons or holes, generated in a semiconductor in the three beam embodiment, generally satisfy the equation:

$$\dot{J}_{e,h}\hat{\eta}_{e,h}:E^{\omega 1}E^{\omega 2}E^{\omega 3}+\text{c.c.}-J_{e,h}/T_{e,h} \quad (1)$$

where e,h refer to electrons and holes, respectively, depending on which type of electrical charge is being considered.

$E^{\omega 1},E^{\omega 2},E^{\omega 3}$ are the (complex) field vector amplitudes associated with the beams $\omega_1$, $\omega_2$, $\omega_3$ in the three beam embodiment.

$T_{e,h}$ are phenomenological current relaxation times.

J is an electrical current density vector.

$\dot{J}$ is the time rate of change of the electrical current density vector.

$\hat{\eta}$ is a material response tensor.

c.c. means complex conjugate.

It is apparent from equation (1) that changing the polarization of one, or more, of the beams $\omega_1$, $\omega_2$, $\omega_3$ will change the propagation of the charges e, h in the semiconductor 20 in a predictable, and therefore, controllable manner.

In the same manner, it is apparent that additional control of the direction and magnitude of the current in the semiconductor 20 can be obtained by varying both the phase relationship between the first beam $\omega_1$ the second beam $\omega_2$ and the third beam $\omega_3$, and, in addition, varying the polarization of at least one of the three beams $\omega_1$, $\omega_2$ and $\omega_3$.

The preferred embodiment shown in FIG. 1A has been discussed in terms of the three beams, namely the first beam $\omega_1$ having a wavelength of 800 nm, the second beam $\omega_2$ having a wavelength of 1.5 µm and the third beam $\omega_3$ having a wavelength of 1.7 µm, such that the frequency of the first beam $\omega_1$ substantially equals the sum of the frequency of the second beam $\omega_2$ and the frequency of the third beam $\omega_3$. However, it has been found that the same method and apparatus 10 discussed above with respect to three beams $\omega_1$, $\omega_2$, $\omega_3$, can also be extended to embodiments comprising a larger number of beams provided the other characteristics of these beams satisfy the characteristics of beams $\omega_1$, $\omega_2$, $\omega_3$ discussed above. In other words, if more than three beams $\omega_1$, $\omega_2$, $\omega_3$ are used, it is necessary that the frequency of the first beam $\omega_1$ be substantially equal to a sum of the frequencies of all of the other coherent light beams irradiating the selected region 26 at substantially the same time. In addition, it is necessary that the first beam c has an amplitude relative to the other beams such that the other beams together produce substantially the same number of electrical charges in the semiconductor material 20 as the first beam $\omega_1$.

For example, if four beams $\omega_1$, $\omega_2$, $\omega_3\omega_4$ (not shown) were used, it would be necessary that the frequency of the first beam $\omega_1$ be substantially equal to a sum of the frequencies of the other beams, namely the second beam $\omega_2$, the third beam $\omega_3$ and the fourth beam $\omega_4$. Likewise, it would be necessary that the amplitude of the second beam $\omega_2$, the third beam $\omega_3$ and the fourth beam $\omega_4$ be such that these beams $\omega_2$, $\omega_3$, $\omega_4$ together produce substantially the same number of electrical charges in the semiconductor material 20 as the first beam $\omega_1$. It is understood that in a similar manner, the present invention will operate with five beams, six beams, etc.

In the embodiment shown in FIG. 1A, the three beams $\omega_1$, $\omega_2$, $\omega_3$ are shown as being separate beams and do not necessarily overlap in space and time except at the selected region 26 where the three beams $\omega_1$, $\omega_2$, $\omega_3$ are focused by the curved mirror MC. However, it is understood that the invention could also operate if the three beams overlapped in space and time throughout the apparatus 10 such that they occupy the same space during the same time period from the parametric generator 14 through to the selected region 26 of the semiconductor 20.

As described above with respect to FIG. 1A, the frequency of the second beam $\omega_2$ can differ from the frequency of the third beam $\omega_3$. In this way, increased versatility is provided in that a potentially infinite number of frequencies can be used in the three beam embodiment, provided the sum of the frequency of the second beam $\omega_2$ and the frequency of the third beam $\omega_3$ substantially equals the frequency of the first beam $\omega_1$. When embodiments with four or more beams are considered, the invention offers even more versatility provided the frequency of one of the beams substantially equals the sum of the frequencies of the other beams.

In a special or "degenerate" case, it is possible that the frequency of the second beam $\omega_2$ substantially equals the frequency of the third beam $\omega_3$. In this case, the embodiment will still operate provided that the frequency of the first beam $\omega_1$ is equal to the frequency of the second beam $\omega_2$ plus the frequency of the third beam $\omega_3$. In this special case, it is possible that the third beam $\omega_3$ and the second beam $\omega_2$ be formed by one beam only because the frequencies of the second beam $\omega_2$ and third beam $\omega_3$ are the same. In other words, the frequency of the first beam $\omega_1$ is two times the frequency of the second beam $\omega_2$.

Figure 3:
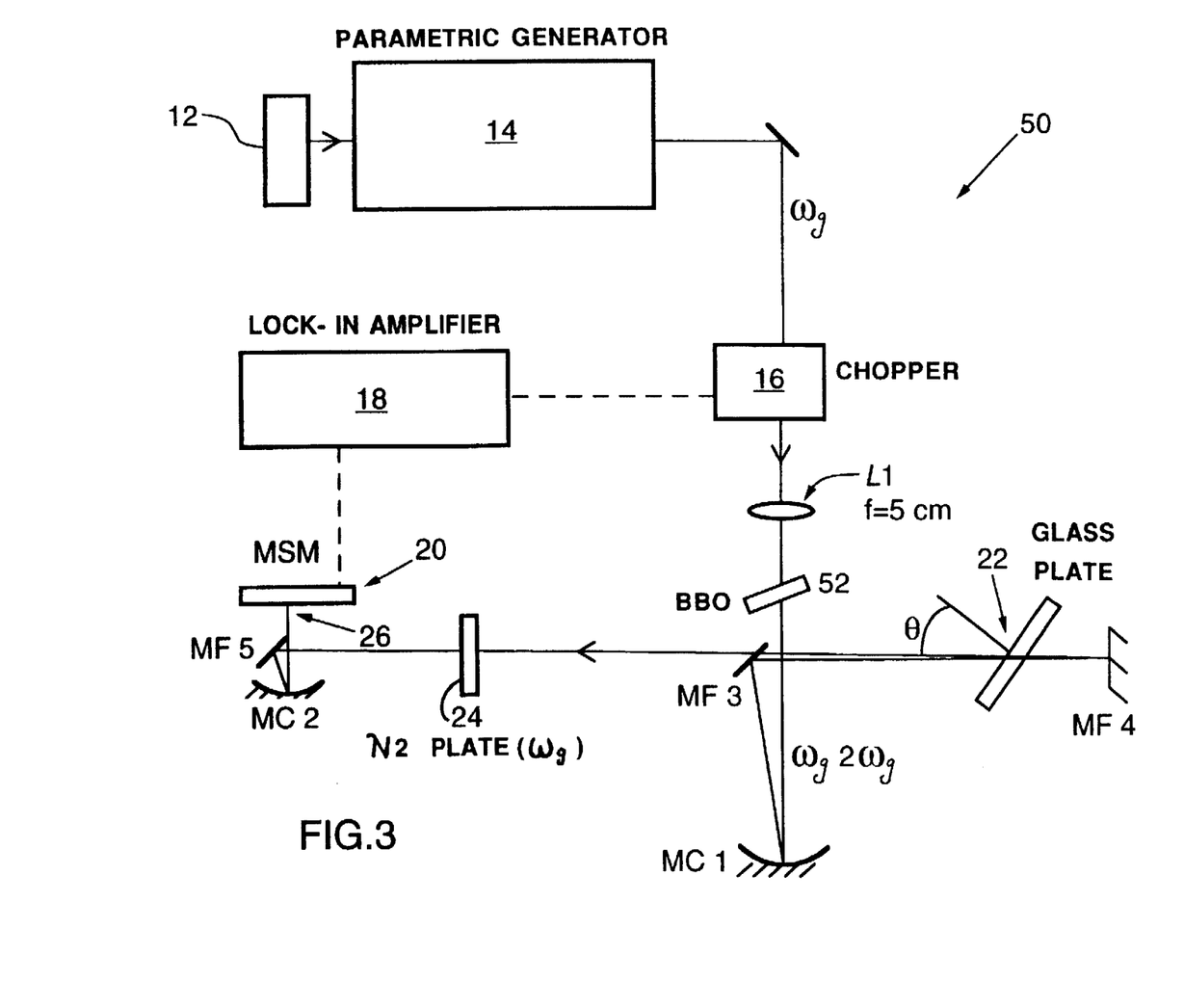
FIG. 3 is a block diagram of an apparatus according to a further embodiment of the present invention.

FIG. 3 shows the apparatus for the special or degenerate case, marked generally as 50. The apparatus 50 comprises several components which are also shown in FIG. 1A, and, like components are marked with like reference numerals.

The apparatus 50 shown in FIG. 3 comprises an optical source 12, which in a preferred embodiment is an actively mode-locked picosecond Ti:sapphire laser, and is used to synchronously pump the KTP-based parametric generator 14. However, the generator 14 in this embodiment produces a single 1 ps coherent pulsed beam tunable near 1500 nm, and hereafter referred to as $\omega_g$ and identified in FIG. 3 by reference symbol $\omega_g$. The apparatus 50 further comprises a chopper 16 and lock-in amplifier 18, which perform a similar function to that in FIG. 1A. Apparatus 50 further comprises a lens L1 with a 5 cm focal length which focuses the beam $\omega_g$ onto a 1 mm thick BBO (β-barium borate) crystal 52 using type I phase matching which generates a second beam (hereafter referred to as $2\omega_g$) at the second harmonic of the first beam $\omega_g$. These beams $\omega_g$, $2\omega_g$ are focused by the curved mirror MC1 to the flat mirror MF3 through the glass plate 22 and half wave plate 24, to finally be focused by curved mirror MC2 onto the semiconductor 20. The beams $\omega_g$, $2\omega_g$ overlap in space and time in FIG. 3.

The half wave plate 24 in this embodiment varies the polarization of one of the beams relative to the gap direction parallel to the (100) crystallographic axis. By varying the polarization of one or both of the beams $\omega_g$, $2\omega_g$, the magnitude and/or direction of the current created by the propagating electrical charges generated in the semiconductor 20 can be changed in a predetermined manner from a magnitude in any number of directions to zero where no effect is measured. In this way, the direction and/or magnitude of the current can be controlled without varying the phase difference between the first beam $\omega_g$ and the second beam $2\omega_g$. Of course, it is possible to control the direction and/or magnitude of the current by varying both the polarization of one or more of the beams $\omega_g$, $2\omega_g$ and the phase difference between the beams also.

As stated above with respect to the embodiment shown in FIG. 1A, the polarization of any one of the beams $\omega_g$, $2\omega_g$ can also be varied such as by causing the beams $\omega_g$, $2\omega_g$ to be circularly polarized or elliptically polarized. Other manners of varying the polarization of the beams $\omega_g$, $2\omega_g$ are also possible as are known to persons skilled in the art.

Figure 4:
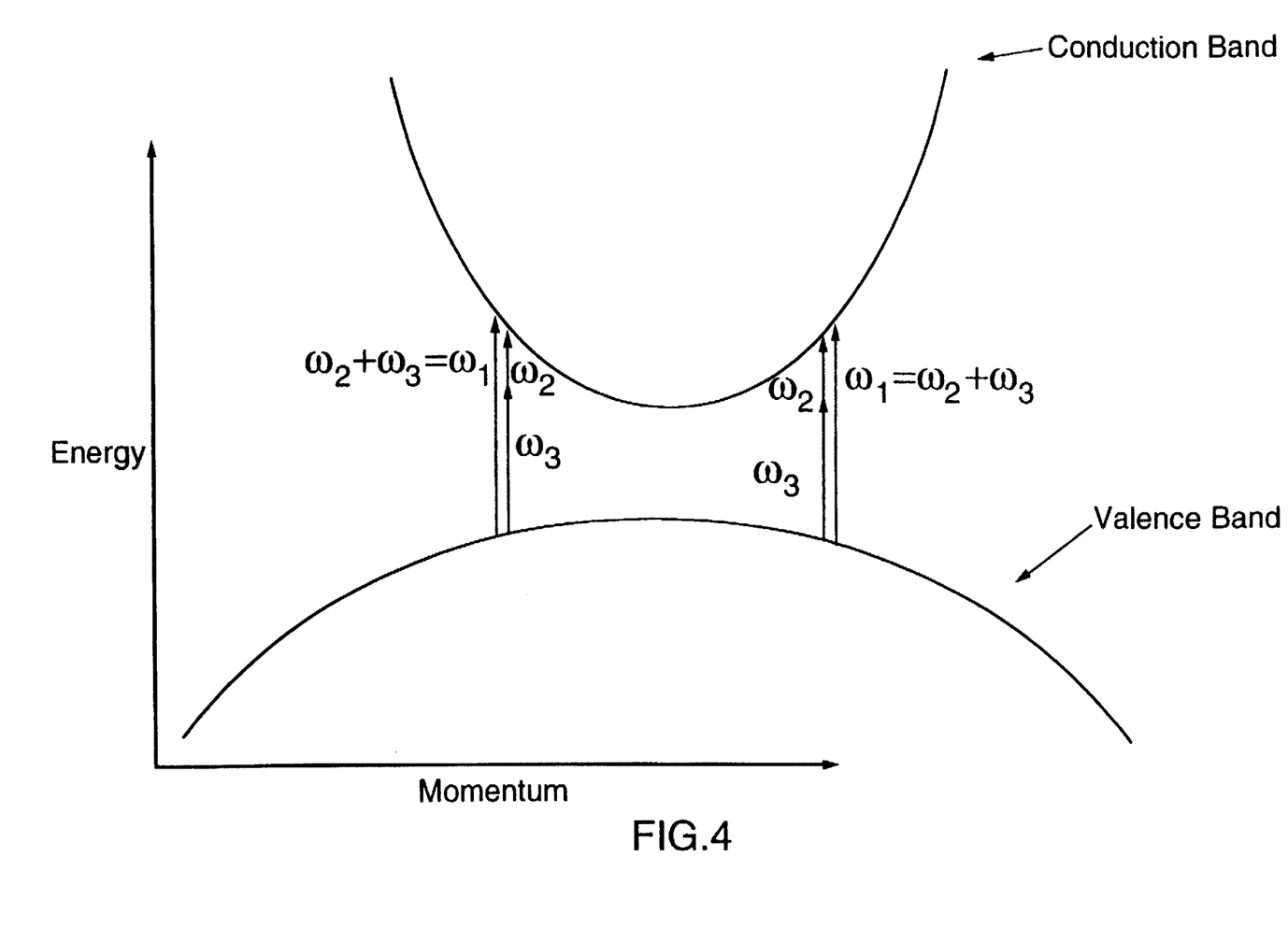
FIG. 4 illustrates the principles of current generation and propagation showing valence and conduction band carriers.

FIG. 4 illustrates theoretically how the embodiment shown in FIG. 1 operates, however, it is understood that the invention is not limited to this theoretical explanation. FIG. 4 is a representation in momentum space showing the production of the photoelectrons and the effect described in the embodiment shown in FIG. 1A. The abscissa of FIG. 4 represents the momentum of the electrons and the ordinate of FIG. 4 represents the energy of the electrons. FIG. 4 shows the three beam embodiment where the frequency of the first beam $\omega_1$ is substantially equal to the sum of the frequency of the second beam $\omega_2$ and the frequency of the third beam $\omega_3$. As shown in FIG. 4, the first beam $\omega_1$ causes photoelectrons to jump from the valence band to the conduction band. The second beam $\omega_2$ and the third beam $\omega_3$ together can also generate photoelectrons. By varying the phase relationship between the three beams $\omega_1$, $\omega_2$, $\omega_3$ and/or varying the polarization of at least one of the beams $\omega_1$, $\omega_2$, $\omega_3$, it would be possible to alter the interference between the two processes to thereby control the direction and magnitude of the current created by the propagation of the photoelectrons generated by the three beams $\omega_1$, $\omega_2$, $\omega_3$.

It is understood that while the present invention has been described with respect to a particular type of laser to produce a coherent light beam, the invention is not limited to this type of laser. Rather other types of coherent light sources could be used. For example other types of lasers, such as diode lasers, could be used.

It is understood that the present invention is not temperature sensitive. In the preferred embodiment, utilizing the LT-GaAs as the semiconductor 20, the experiments were conducted at room temperature and the same results could also be obtained at other temperature ranges, such as within a temperature range of between about $-40°$ C. and $100°$ C.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A method of generating and propagating electrons in a semiconductor material, said propagating electrons creating a current having a direction and a magnitude, the method comprising the steps of:
   simultaneously irradiating a selected region of the semiconductor material with a first coherent light beam having a first frequency and at least two other coherent light beams, each beam having a frequency, wherein said first light beam and said at least two other light beams are related such that the first frequency substantially equals a sum of the frequencies of the at least two other coherent light beams, and wherein the at least two other beams together produce substantially the same number of electrons in the semiconductor material as the first beam.

2. The method as defined in claim 1 further comprising the step of varying a phase relationship between the first beam and the at least two other beams to change the direction of the current.

3. The method as defined in claim 1 further comprising the step of varying a polarization of at least one of the beams to change the direction of the current.

4. The method as defined in claim 1 further comprising the step of varying a polarization of at least one of the beams to change the magnitude of the current.

5. The method as defined in claim 1 further comprising the step of varying a polarization of one of the beams to change the direction and magnitude of the current.

6. The method as defined in claim 1 further comprising the step of varying both a polarization of at least one of the beams and a phase relationship between the first beam and the at least two other light beams to change the direction of the current.

7. The method as defined in claim 1 wherein the at least two other coherent light beams comprise a second coherent light beam having a second frequency and a third coherent light beam having a third frequency, and wherein said first, second and third beams have a predetermined phase relationship and are related such that the first frequency substantially equals a sum of the second frequency and the third frequency, and wherein the second and third beams together produce substantially the same number of electrons in the semiconductor material as the first beam.

8. The method as defined in claim 7 further comprising the step of varying a polarization of at least one of the first beam, the second beam and/or the third beam to change the direction and magnitude of the current.

9. The method as defined in claim 8 wherein the duration of the first beam, second beam and third beam is about 1 picosecond and wherein the first beam, second beam and third beam overlap in space and time.

10. The method as defined in claim 7 further comprising the step of varying the phase relationship between the first beam, second beam and third beam to change the direction and magnitude of the current.

11. The method as defined in claim 10 wherein the second frequency differs from the third frequency.

12. The method as defined in claim 7 further comprising the step of varying both a polarization of at least one of the beams and the phase relationship between the first beam, second beam and third beam to change the direction and magnitude of the current.

13. The method as defined in claim 12 wherein the semiconductor material has a temperature and the temperature of the semiconductor material is between about $-40°$ C. and $100°$ C. and wherein the semiconductor material is LT-GaAs.

14. The method as defined in claim 13 wherein holes propagate in the semiconductor material in a direction substantially opposite to the direction of the current.

15. The method as defined in claim 7 wherein the second frequency is substantially the same as the third frequency and further comprising the step of varying a polarization of at least one of the first beam, the second beam and/or the third beam to change the direction and magnitude of the current.

16. A method of generating and propagating electrons in a semiconductor material, the propagating electrons creating a current having a direction and magnitude, the method comprising the steps of:
   (a) simultaneously irradiating a selected region of the semiconductor material with a first coherent light beam having a first frequency and a second coherent light beam having a second frequency, wherein said first light beam and the second light beam are related such that the first frequency is substantially twice the second frequency and the first beam produces substantially the same number of electrons in the semiconductor material as the second beam; and
   (b) varying a polarization of the first beam or the second beam relative to the semiconductor material to change the direction and magnitude of the current.

17. The method as defined in claim 16 further comprising the step of varying the phase relationship between the first beam and the second beam to change the direction and magnitude of the current.

18. An apparatus for controlling propagation of electrons in a semiconductor material comprising:
   coherent light source means for providing a first coherent light beam having a first frequency and at least two other coherent light beams, each of the at least two other beams having a frequency, to simultaneously irradiate a selected region of the semiconductor material, the coherent light beams being related such that the first frequency substantially equals a sum of the frequencies of the at least two other coherent light beams, and wherein each of the beams have an amplitude such that the at least two other beams together produce substantially the same number of electrons in the semiconductor material as the first beam;

wherein irradiating the selected region of the semiconductor causes electrons to propagate in the semiconductor, said propagating electrons creating a current having a direction and a magnitude.

19. The apparatus as defined in claim 18 further comprising:

means for varying a polarization of at least one of the beams; and wherein varying the polarization causes the direction and/or magnitude of the current to change.

20. The apparatus as defined in claim 19 wherein the semiconductor material has a temperature and the temperature of the semiconductor material is between about −40° C. and 100° C.;

wherein the semiconductor material is LT-GaAs; and wherein the duration of the first beam, second beam and third beam is about 1 picosecond.

21. The apparatus as defined in claim 18 further comprising:

means for varying a phase relationship between two or more of the beams when they enter the semiconductor material; and wherein varying the phase relationship causes the direction and/or magnitude of the current to change.

22. The apparatus as defined in claim 18 wherein the at least two other coherent light beams provided by the coherent light source means comprise a second coherent light beam having a second frequency and a third coherent light beam having a third frequency, and wherein said first, second and third beams have a predetermined phase relationship and are related such that the first frequency substantially equals a sum of the second frequency and the third frequency, and wherein the second and third beams together produce substantially the same number of electrons in the semiconductor material as the first beam; and wherein the apparatus further comprises means for varying the phase relationship; and wherein varying the phase relationship causes the direction and magnitude of the current to change.

23. The apparatus as defined in claim 22 wherein the second frequency differs from the third frequency.

24. The apparatus as defined in claim 22 wherein the semiconductor material has a temperature and the temperature of the semiconductor material is between about −40° C. and 100° C.;

wherein the semiconductor material is LT-GaAs; and wherein the duration of the first beam, second beam and third beam is about 1 picosecond.

* * * * *